United States Patent Office 3,363,996
Patented Jan. 16, 1968

3,363,996
BISMUTH THIOSELENIDE AND A METHOD FOR ITS PREPARATION
Meyer S. Silverman, Norristown, Pa., assignor to Pennsalt Chemicals Corporation, Philadelphia, Pa., a corporation of Pennsylvania
No Drawing. Filed Sept. 10, 1964, Ser. No. 395,587
5 Claims. (Cl. 23—315)

ABSTRACT OF THE DISCLOSURE

A new bismuth thioselenide compound is provided wherein the atomic ratio of bismuth to sulfur to selenium is about 1:1:1. A method of preparation of the new bismuth thioselenide is the simultaneous application of elevated temperatures and high pressure to a mixture of elemental bismuth, elemental sulfur and elemental selenium, i.e., a temperature of at least about 500° C. and a pressure of at least 30 kilobars.

This invention relates to a new compound of selenium, sulfur and bismuth and, in particular, relates to bismuth thioselenide having a bismuth to selenium atomic ratio of about 1:1; and which contains equal molar quantities of sulfur and selenium.

While $Bi_2(S, Se)_3$ called guanajuatite, is known, no previous reports of bismuth thioselenides (that is, compounds containing approximately equal molar quantities of sulfur and selenium) and having a Bi:S atomic ratio of less than 4:3 (about 1:2) have been found. Chemical analysis of a combined product from repeated preparations has shown the new compound of the present invention to have the approximate empirical formula $Bi_nS_nSe_n$. Details of this analysis are given in Example 1.

The differences between the new thioselenide of bismuth and the previously known thioselenide are also demonstrated by differences in the electrical properties of the compounds. The specific resistivity of the new thioselenide was found to vary in a manner indicating that the crystals were anisotropic, but all values determined for the new thioselenide were below about 27,000 ohms while no values for the previously known $Bi_2(Se, S)_3$ compound were below 50,000 ohms.

While the new compound is, for all practical purposes, stable at room temperature, it is converted to the conventional guanajuatite when heated to temperatures of above about 237° C. This conversion reaction is accomplished by the formation of free sulfur and free selenium both of which are usually oxidized if the conversion reaction is performed in the presence of air.

The conversion of the new bismuth selenide to the conventional, more electrically conductive, form of bismuth selenide offers a useful method for sensing temperatures in excess of the approximately 237° C. at which this conversion takes place. For example, a sample of the new compound can be placed in an electrical circuit so balanced that its high resistance does not permit current to flow in appreciable quantities. When the sample is raised to a temperature of about 237° C. the accompanying increase in electrical conductivity will permit current to flow. This current can be used to energize a solenoid or relay or other electrical devices. Because no moving parts need be involved in such a system, it can be made resistant to high acceleration loads such as are commonly encountered in rockets and in rapidly vibrating equipment.

The raw materials for the practice of the present invention are preferably elemental bismuth, sulfur and selenium. The bismuth used in the preparations described in the examples of this application is Fisher Scientific Company, Reagent grade, more than 99.9+% pure. A technical grade of 95+% selenium from Harshaw Chemical Company is used in the preparations as is a 99.999+ grade of sulfur obtained from American Smelting and Refining Company.

The preferred process for manufacturing the new compound involves high temperatures and high pressures. Temperatures in the range of about 500° C. or more, preferably 800–900° C. and pressures in the range of about 30 or more kilobars and preferably about 45 kilobars are used for the preparation of the new compound of the present invention, and are utilized in the examples which follow. However, the compound of the present invention may be prepared by reactions conducted over a range of temperatures and pressures, and the extent of this range is readily established by routine tests. It should be understood that the new compound of the present invention is in no way dependent upon the manner in which it is formed.

About 1.1 moles of sulfur and 1.1 moles of selenium are preferably present for each mole of bismuth in the reaction mixture.

The term "kilobar" as used throughout this application means 986.9 atmospheres or 14,503.8 lbs./sq. in.

The reaction time for the preparation of the new compounds may be from 1 second to about 24 hours, but best results may be obtained at reaction times of from 1 to about 15 minutes. Optimum reaction times will vary somewhat depending upon the reaction conditions and on the geometry of the reactor.

After reaction of the bismuth with the sulfur and selenium, the excess raw materials must be removed from the product. This is readily accomplished by repeated washings in $CS_2$ with suction filtration followed by ether rinsing and air drying.

Other methods for producing the new compound, including principally the in situ reaction of ingredients capable of forming bismuth thioselenide, will be apparent and may be used in place of the preferred reaction of bismuth with selenium.

The apparatus used in the examples which illustrate the practice of the present invention is similar to that developed at the National Bureau of Standards and described in "Compact Multianvil Wedge Type High Pressure Apparatus," E. C. Lloyd, U. O. Hutton and D. P. Johnson in the Journal of Research of the National Bureau of Standards, vol. 63C, No. 1, July–September 1959, pages 59–64. In place of the $9/16''$ tetrahedral sample holders used in the above reference, $5/8''$ holders with $1/2''$ anvil faces were employed in the examples which follow and, alternatively, $5/16''$ holders were used with $3/4''$ anvil faces. A polyester film ("Mylar" manufactured by DuPont Company) was used between the anvil assemblies and the polytetrafluoroethylene sheet ("Teflon," manufactured by DuPont Company). Additionally, a 0.003″ wall boron nitride sleeve was used between the sample and the graphite heaters as electrical insulation. Force was applied to the tetrahedral anvil system by a Watson-Stillman 100-ton hydraulic laboratory press. Pressure calibration was done by measuring the electrical resistance change of bismuth samples. Pressure was measured as a function of ram force and the three discontinuities were considered to occur at 25.4, 27.0 and 88 kilobars. In all of the preparations, a thin sleeve of spectroscopic grade graphite was used as the heating element around the sample, and end plugs of the same material isolated the sample from the platinum or silver tabs that carried the current from the anvils to the heating sleeve. Temperature calibrations were done by measuring the electrical power input required to obtain temperatures which were indicated by a Chromel-Alume thermocouple, the tip of which was in good contact with the center of the graphite heating sleeve. The temperatures reported here are thus the highest to which any part of the sample was subjected, and it should be recognized that the ends of the sample in each case were somewhat cooler. Experience in repeated calibrations indicates that the temperature values are uncertain by approximately ±50° C., but the relative differences among the temperature levels of the experiment are believed to be quite reliable.

In each preparation the sample was first compressed in the high pressure apparatus, then heated, and then held at the desired conditions for a measured period of time. The high pressure was then maintained until the power was turned off and the sample had cooled to nearly ambient temperature. Cooling was very rapid in all cases.

The X-ray diffraction powder pattern obtained from each run of the new bismuth thioselenide showed a characteristics set of lines. The X-ray patterns were obtained by use of a conventional General Electric Model XRD-1 diffractometer using 0.5 mm. diameter glass capillaries as the sample containers. Intensities were conventionally measured with a Photovolt Densicord densitometer. Major lines of the diffraction pattern were as shown in Table I.

TABLE I

X-ray powder pattern of new bismuth thioselenide, $Bi_nS_nSe_n$
[100=maximum intensity]

| d. A. | I |
|---|---|
| 6.2 | 20 |
| 4.58 | 20 |
| 4.18 | 40 |
| 4.00 | 20 |
| 3.80 | 30 |
| 3.15 | 100 |
| 2.96 | 35 |
| 2.65 | 50 |
| 2.59 | 20 |
| 2.53 | 20 |
| 2.31 | 35 |
| 2.21 | 25 |
| 2.04 | 40 |
| 2.00 | 20 |
| 1.97 | 40 |
| 1.92 | 30 |
| 1.85 | 25 |
| 1.84 | 30 |
| 1.678 | 20 |
| 1.530 | 30 |

TABLE II

X-ray pattern of known $Bi_2(S, Se)_3$*
[100=maximum intensity]

| d. A. | I |
|---|---|
| 5.83 | 30 |
| 5.16 | 40 |
| 4.08 | 30 |
| 3.83 | 20 |
| 3.65 | 90 |
| 3.33 | 20 |
| 3.19 | 100 |
| 3.03 | 20 |
| 2.88 | 60 |
| 2.77 | 30 |
| 2.70 | 20 |
| 2.58 | 50 |
| 2.31 | 50 |
| 2.17 | 20 |
| 1.987 | 70 |
| 1.907 | 20 |
| 1.595 | 40 |
| 1.519 | 40 |

*Source: ASTM-10-475, R. M. Thompson, University of British Columbia, Vancouver, Canada.

EXAMPLE 1.—PREPARATION OF THE NEW BISMUTH THIOSELENIDE

A mixture of 1.1 parts of technical grade selenium and 1.1 parts of 99.999+% sulfur with one part of 99.9+% pure bismuth is finely ground in a Spex Industries heavy duty mixer mill and then pelletized with a Dickinson 2-ton capacity hand press. The pellet is loaded into a boron-nitride sleeve which is in a graphite heater sleeve in a pyrophyllite tetrahedron, all as previously described in more detail. The completed tetrahedron is placed in the tetrahedral anvil apparatus and the whole assembly is then inserted between the pressure platens of a Watson-Stillman 100-ton capacity hydraulic press. Pressure on the sample is increased to about 46 kilobars and temperature is then increased to about 810–835° C. and maintained for about five minutes. After five minutes, the heating power is switched off and after a cooling period of an additional five minutes the pressure is released. The product is removed, washed and examined. It is found to consist of small charcoal gray crystals of irregular shape. The X-ray diffraction pattern of the crystals is characteristic of the new bismuth thioselenide as shown in Table I. Analysis of the product by conventional gravimetric methods is in good agreement with a proposed empirical formulation of $Bi_nSe_nS_n$. Found: Bi, 64.6%; Se, 23.6%; S, 10.4%. Calculated for $Bi_nSe_nS_n$: Bi, 65.2%; Se, 24.6%; S, 10.2.

EXAMPLE 2.—CHEMICAL REACTIVITY OF THE NEW BISMUTH THIOSELENIDE

When the new bismuth thioselenide is exposed to a number of common reagents, the results are as tabulated below:

| Reagents: | Observation |
|---|---|
| Distilled water | No reaction. |
| Concentrated sulfuric acid | No reaction. |
| Concentrated hydrochloric acid | No reaction. |
| Concentrated nitric acid | Vigorous immediate reaction. Product appears light yellowish-orange porous material. |
| Concentrated ammonium hydroxide | No reaction. |
| 50% by weight aqueous sodium hydroxide | Slow reaction colors liquid reddish-copper. |
| 0.1 N sodium hydroxide | Slow reaction colors liquid reddish-copper. |

EXAMPLE 3.—DETERMINATION OF THE DENSITY OF THE NEW BISMUTH THIOSELENIDE

The density of the new material was measured on a Berman torsion-type density balance. The weight of each of the materials is first taken in air and then in toluene and the resulting observations are used to calculate the density. Irregularly shaped crystals of charcoal-grey product having an X-ray diffraction pattern identical with that shown in Table I (with minor amounts of starting materials) are produced when the Bi:Se:S mixture was subjected to 47 kilobars, 805° C. for 4 minutes, according to the procedures outlined in Example 1. The resulting density measured on the Berman balance in toluene and in air, is approximately 6.37± about 0.06 g./cc.

Similarly, a run at 47 kilobars and 900° C. for 5 minutes produces material identical to the above product, and having a density of about 6.35 g./cc.

When a charcoal-colored product easily scratched with a steel probe, having virtually the X-ray diffraction pattern shown in Table I and obtained from a run according to the raw materials and procedures of Example 1 at 47 kilobars and 840° C. for 5 minutes is measured in the Berman balance, as above, the density measured is 6.53± about 0.06 g./cc.

Density for the previously known form $Bi_2(S, Se)_3$ produced according to Example 1 at 23.5 kilobars, 800° C. and 4 minutes having the X-ray pattern of Table II is determined by the above method to be 6.04 g./cc.

EXAMPLE 4.—THE THERMAL BEHAVIOR OF THE NEW BISMUTH THIOSELENIDE

A run carried out according to the starting materials and procedures of Example 1 at a pressure of 46 kilobars, 810° C. for 5 minutes, using a 1:1.1:1.1 atomic ratio of Bi:Se:S gives a shiny silver-black, polycrystalline having the X-ray diffraction pattern of the new thioselenide as shown in Table I (with minor amounts of starting materials). When the product is pulverized and heated to 224° C. in air, then cooled, the X-ray diffraction pattern of the residue continues to show the characteristic pattern of Table I. When heated in $N_2$ to 237° C. in a Chevenard thermobalance, the material decomposes to the guanajuatite form as indicated by the X-ray diffraction pattern of Table II.

EXAMPLES 5-6.—ADDITIONAL PREPARATION OF THE NEW BISMUTH THIOSELENIDE

The following Examples 5 and 6 utilize the same procedures outlined more fully in Example 1.

Example 5.—A 1:1.1:1.1 atomic ratio Bi:Se:S mixture reacted for about 5 minutes at 1140° C. and 30 kilobars yields the $Bi_nS_nSe_n$ form of the present invention as indicated by X-ray diffraction analysis.

Example 6.—A 1:1.1:1.1 atomic ratio Bi:Se:S mixture reacted for about 5 minutes at 548° C. and 47 kilobars gives the new bismuth thioselenide as shown by the characteristic X-ray diffraction pattern in Table I.

Many embodiments of the invention may be made without departing from the spirit and scope thereof, and the invention is to be understood to include all such embodiments and not to be limited by the above description and examples.

I claim:
1. Bismuth thioselenide, having a bismuth to sulfur to selenium atomic ratio of about 1:1:1.
2. A process for producing the compound of claim 1 which comprises heating to a temperature of at least about 500° C. at a pressure of at least about 30 kilobars, a mixture of elemental bismuth, elemental selenium and elemental sulfur.
3. The process of claim 2 wherein the bismuth to selenium to sulfur atomic ratio of the starting materials is from 1:1.0:1.0 to 1:2.0:2.0.
4. The process of claim 2 wherein the bismuth to selenium to sulfur atomic ratio is approximately 1:1.1:1.1.
5. A high-temperature-exposure indicating device comprising a piece of the compound of claim 1 placed in heat transferring contact with a body, said piece being at a pressure of not more than about 10 kilobars, whereby exposure to a temperature of approximately 237° C. is indicated by a readily determined increase in the electrical conductivity of said piece.

References Cited
UNITED STATES PATENTS

| | | | |
|---|---|---|---|
| 1,316,220 | 9/1919 | Case | 23—134 |
| 2,220,116 | 11/1940 | O'Brien | 23—134 |
| 2,944,975 | 7/1960 | Folberth | 23—204 |
| 3,023,079 | 2/1962 | Kulifay | 23—204 |

MILTON WEISSMAN, *Primary Examiner.*

OSCAR R. VERTIZ, *Examiner.*

H. S. MILLER, *Assistant Examiner.*